US012417581B2

(12) United States Patent
Jayaraman

(10) Patent No.: US 12,417,581 B2
(45) Date of Patent: Sep. 16, 2025

(54) BIDIRECTIONAL USER INTERFACE FOR AI AND REAL-TIME COMMUNICATION IN MULTI-SOURCE VR ENVIRONMENT

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 107 days.

(21) Appl. No.: 18/045,499

(22) Filed: Oct. 11, 2022

(65) Prior Publication Data

US 2024/0119665 A1   Apr. 11, 2024

(51) Int. Cl.
*G06F 3/01* (2006.01)
*G06F 3/04815* (2022.01)
*G06T 13/40* (2011.01)
*G06T 17/00* (2006.01)

(52) U.S. Cl.
CPC .......... *G06T 17/00* (2013.01); *G06F 3/04815* (2013.01); *G06T 13/40* (2013.01)

(58) Field of Classification Search
CPC ...................................................... G06T 17/00
USPC ....................................................... 345/419
See application file for complete search history.

(56) References Cited

U.S. PATENT DOCUMENTS

| | | | | |
|---|---|---|---|---|
| 2013/0047217 A1* | 2/2013 | Shuster | ................. | G06F 40/143 726/4 |
| 2016/0293133 A1* | 10/2016 | Dutt | ....................... | G06N 3/047 |
| 2019/0245850 A1* | 8/2019 | Tokuchi | ................. | G06F 21/32 |
| 2021/0216349 A1* | 7/2021 | Munro | .................... | G06F 9/453 |

OTHER PUBLICATIONS

Peña-Ríos, Using mixed-reality to develop smart environments, 978-1-4799-2947-4/14 $31.00 © 2014 IEEE, pp. 182-189 (Year: 2014).*
Thisarani et al. Artificial Intelligence for Futuristic Banking (Year: 2021).*

* cited by examiner

*Primary Examiner* — Samantha (Yuehan) Wang
(74) *Attorney, Agent, or Firm* — Michael A. Springs, Esq.; Shumaker, Loop & Kendrick, LLP; Patrick B. Horne

(57) ABSTRACT

In a bidirectional user interaction in a graphically simulated environment, a network connection operatively connects a computing system to at least one user device. The computing system performs steps including: causing display, on the user device, of a simulated agent of a first entity in the three dimensional virtual environment; controlling the simulated agent to engage a user represented by a user customized graphical indicium in the three dimensional virtual environment; conducting a bidirectional communication session with the user via the simulated agent and the user customized graphical indicium in the three dimensional virtual environment; receiving a request from the user regarding at least one service of multiple services made available at least in part by the first entity; and disseminating at least a first information item associated with the at least one service.

20 Claims, 8 Drawing Sheets

BIDIRECTIONAL USER INTERFACE FOR AI AND REAL-TIME COMMUNICATION IN MULTI-SOURCE VR ENVIRONMENT

FIELD

This invention relates generally to the field of graphical modeling, and, more particularly, embodiments of the invention relate to real time communications of a user with virtual and/or real participants engaging in a graphically simulated environment.

BACKGROUND

The creation of the internet is generally credited to universities and their activities in interconnecting once disparate computer networks to facilitate collaborations in research. What began as a means for researchers and students to share data, code, and processing time, evolved into a widespread connection platform for people of all walks. While early email exchanges and shared communication threads were likely focused on academic pursuits, human nature broadly repurposed those and other evolving communication means to serve every human interest and even whim. The internet now connects, informs, and entertains people the world over; and of course the wide space and access the internet represents is utilized and driven by advertising.

As computing power evolves, with reference to the processing powers of handheld devices, home-based computers, portable machines such as laptops, and to cloud-computing as well, users are seeking out immersive and at least visually realistic experiences. User develop alter-egos, heroic versions of themselves, and context—specific characters they control in gaming and other virtual environments. These user-representative characters are often termed avatars and users are increasingly spending considerable time, effort, thought and even resources on their avatars.

Akin to the broad purposing of the internet as it developed, uses for the potentially broad space of what is being called the metaverse, which is essentially conducted across the internet, are likely to expand across all human interests. The concept and future of the metaverse go far beyond just a nominal re-terming of the same space now called the internet. A virtual and multi-purpose space is being constructed that is undeniably navigable by humans via computing devices.

As increasing numbers explore the internet, greater reliance on virtual assistants, greeters, and other automated characters will be needed. While automated phone systems (known as Voice Response Units, or VRUs, among other names) have been in use for many years, these systems generally use a computer to answer phone calls (such as from customers or clients) and have an algorithm which may ask the caller a series of questions and attempt to provide a satisfactory resolution to whatever question or problem the caller is calling about. Similar systems known as "chat engines" or "chat bots" exist and are used for textual interaction with a user, where the user interacts with the chat system via a computer window and keyboard or a mobile device screen.

Existing VRUs and chat engines use algorithms which are programmed based on a human-defined set of rules, such as what question to ask first, and what next question to ask based on various responses to the first question. These systems are, in some instances, able to provide a satisfactory answer to the caller, or direct the caller to additional resources which can provide the answer. However, voice-only based communications fail to exploit the immersive experience possibilities of the metaverse.

BRIEF SUMMARY

Embodiments of the present invention address the above needs and/or achieve other advantages by providing apparatuses, systems, and methods that enable bidirectional user interaction in a graphically simulated environment.

In at least one embodiment, a system for bidirectional user interaction in a graphically simulated environment includes a computing system having one or more processor and at least one of a memory device and a non-transitory storage device. The one or more processor is configured to execute computer-readable instructions, for example as stored on the memory device and/or the non-transitory storage device. A network connection operatively connects the computing system to at least one user device. Upon execution of the computer-readable instructions, the computing system performs steps including: causing display, on the at least one user device, of a simulated agent of a first entity in a three dimensional virtual environment; controlling the simulated agent to engage a user represented by a user customized graphical indicium in the three dimensional virtual environment; conducting a bidirectional communication session with the user via the simulated agent and the user customized graphical indicium in the three dimensional virtual environment; receiving a request from the user regarding at least one service of multiple services made available at least in part by the first entity; and disseminating at least a first information item associated with the at least one service.

The computing system in some examples controls the simulated agent to engage the user represented by the user customized graphical indicium in the three dimensional virtual environment in a virtual-reality (VR) presentation to the user.

The simulated agent may represent or be a virtual agent using conversational artificial intelligence (AI), in which case the virtual agent automatically conducts the bidirectional communication session with the user.

The computing system in some examples connects a human agent into the communication session and causes display of a second simulated agent at least in part controlled in real time by the human agent.

The simulated agent may include or appear as a graphical indicium at least in part controlled in real time by a human agent.

In some examples, the first entity maintains account records each associated with a respective one of multiple users, the multiple user including the user. At least some of the account records associated with the user are inaccessible to the user during the bidirectional communication session without user authentication.

The account records of the user may be accessible to the user during the bidirectional communication session upon user authentication by the user.

The three dimensional virtual environment may be or be represented as a virtual-reality (VR) presentation of a geometric model provided by a third party via a modeling server connected to each of the user device and the computing system.

The simulated agent may be selected by the user from multiple simulated agents each represented in at least one display available to said user by a respective graphical indicium for selection by said user.

Prior to causing display of the simulated agent, the computing system in some examples causes display of a kiosk in the three dimensional virtual environment, in which case causing display of the simulated agent is responsive to the user customized graphical indicium at least approaching the kiosk under user navigational control.

According to at least one embodiment, upon execution of the computer-readable instructions, the computing system performs steps including: causing display, on the at least one user device, of a simulated agent of a first entity in a three dimensional virtual environment in a virtual-reality (VR) presentation; controlling the simulated agent to at least audibly engage a user represented by a user customized graphical indicium in the three dimensional virtual environment; and conducting a bidirectional communication session with the user via the simulated agent and the user customized graphical indicium in the three dimensional virtual environment. The first entity maintains account records each associated with a respective one of multiple users, the multiple user including said user. The account records are inaccessible to said user during the bidirectional communication session without user authentication. The account records of said user are accessible to said user during the bidirectional communication session upon user authentication by said user.

The simulated agent may represent or be a virtual agent audibly using conversational artificial intelligence (AI), in which case the virtual agent automatically conducts the bidirectional communication session with the user.

Prior to causing display of the simulated agent, the computing system may cause display of a marker in the three dimensional virtual environment; and causing display of the simulated agent in such an example may be responsive to the user customized graphical indicium at least approaching the marker under user navigational control.

In some embodiments, a method is provided for a computing system to conduct bidirectional user interaction in a graphically simulated environment, the computing system including one or more processor, at least one of a memory device and a non-transitory storage device, and a network connection for operatively connecting the one or more processor to at least one user device, the one or more processor configured to execute computer-readable instructions. The method includes, upon execution of the computer-readable instructions: causing display, on the at least one user device, of a simulated agent of a first entity in a three dimensional virtual environment; controlling the simulated agent to engage a user represented by a user customized graphical indicium in the three dimensional virtual environment; conducting a bidirectional communication session with the user via the simulated agent and the user customized graphical indicium in the three dimensional virtual environment; receiving a request from the user regarding at least one service of multiple services made available at least in part by the first entity; and disseminating at least a first information item associated with the at least one service.

In some examples of the method, the computing system controls said simulated agent to engage the user represented by the user customized graphical indicium in the three dimensional virtual environment in a virtual-reality (VR) presentation to the user.

In some examples of the method, the simulated agent includes or is represented as a virtual agent audibly using conversational artificial intelligence (AI), and the virtual agent automatically conducts the bidirectional communication session with the user.

In some examples, the method includes connecting a human agent into the communication session and causing display of a second simulated agent at least in part controlled in real time by the human agent.

BRIEF DESCRIPTION OF THE SEVERAL VIEWS OF THE DRAWINGS

Figure 1:
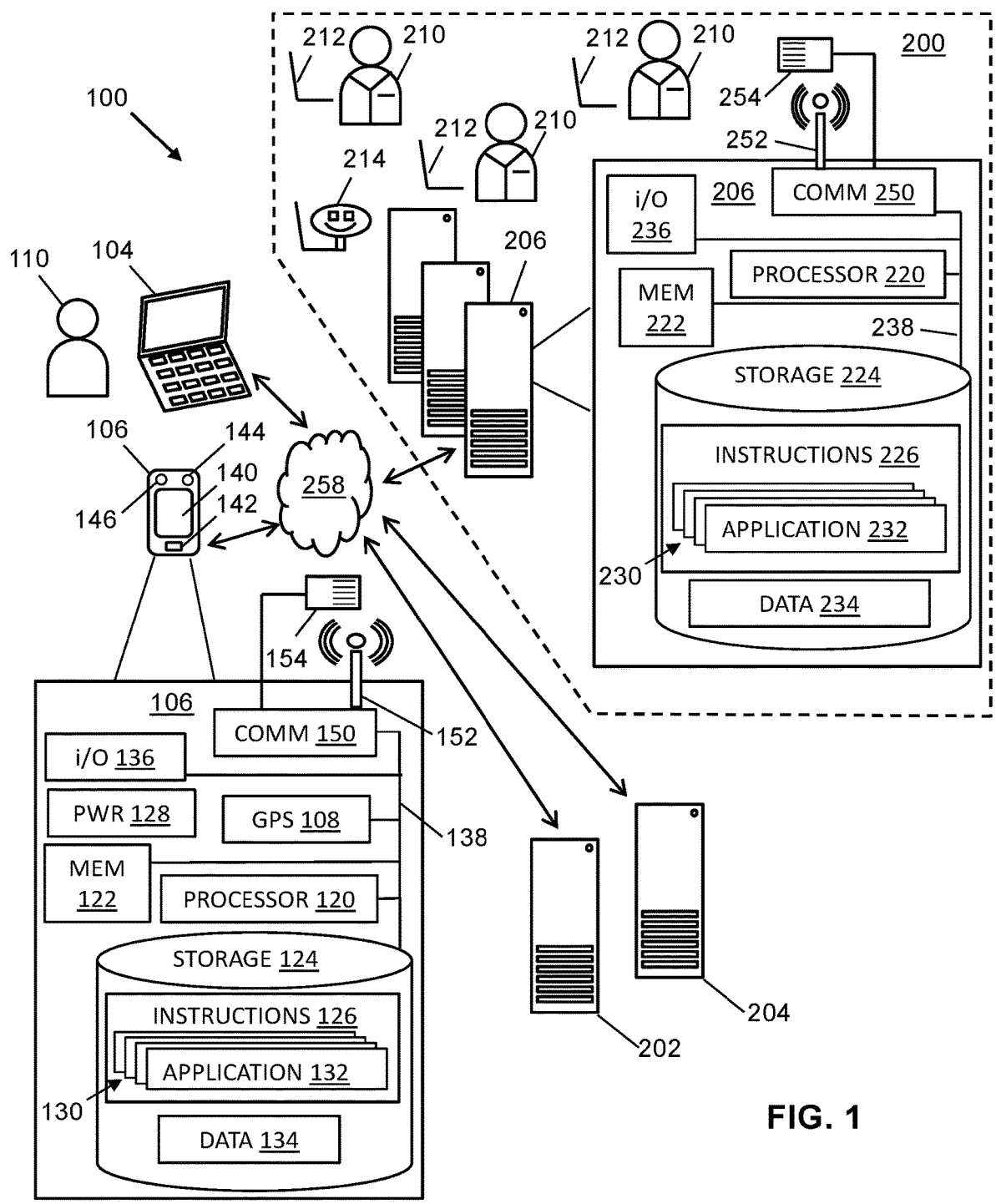
Figure 2A:
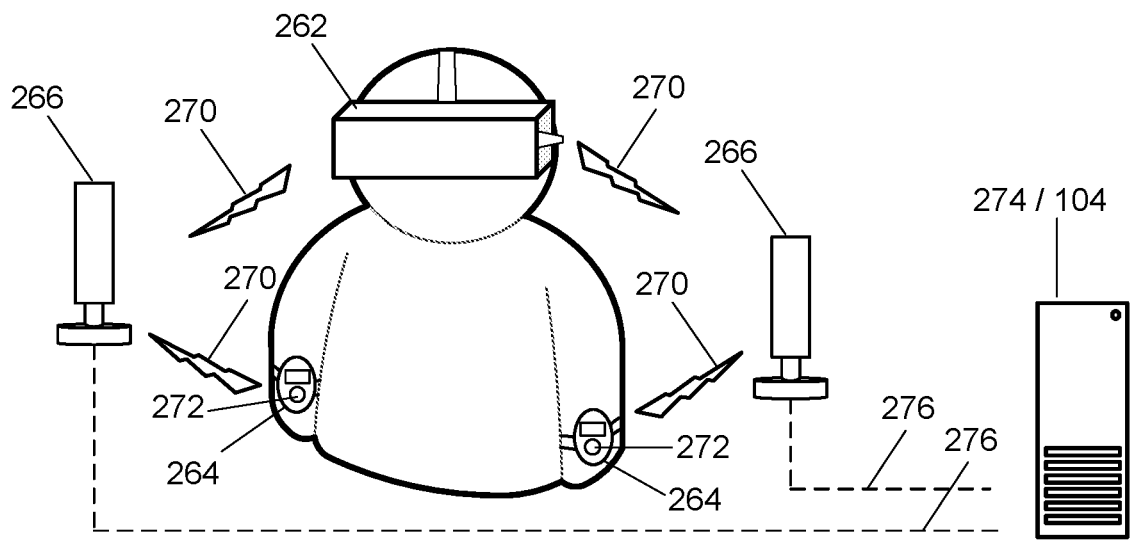

Having thus described embodiments of the invention in general terms, reference will now be made to the accompanying drawings, wherein:

FIG. 1 illustrates an enterprise system and environment thereof for navigating context conversion in geometric modeling, in accordance with at least one embodiment of the present invention;

FIG. 2A illustrates equipment items, according to at least one embodiment, used in a virtual reality (VR) session.

Figure 2B:
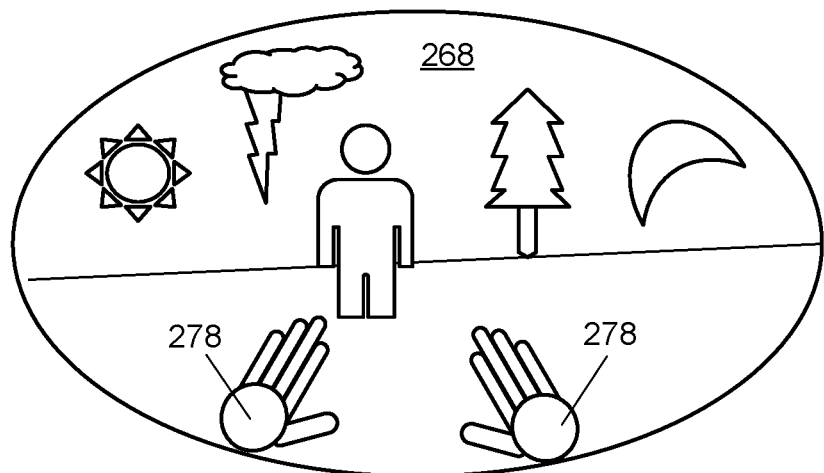

FIG. 2B shows a user view of a simulated environment in a VR session via a helmet or visor.

Figure 3A:
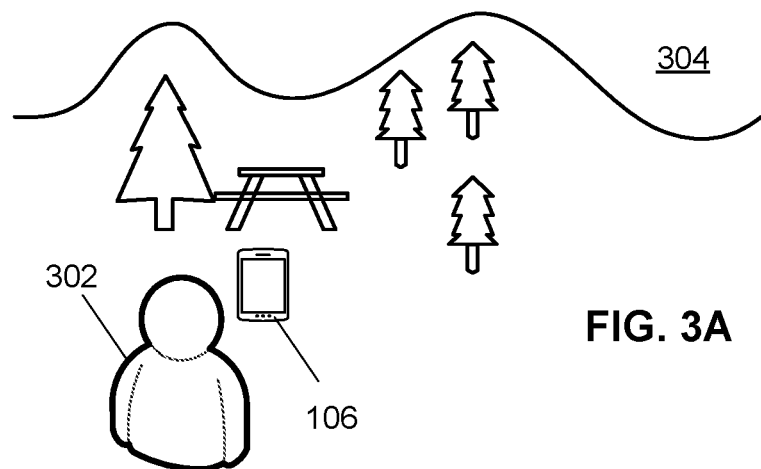

FIG. 3A illustrates an AR session in which a user views a background scene through an AR equipped mobile device.

Figure 3B:
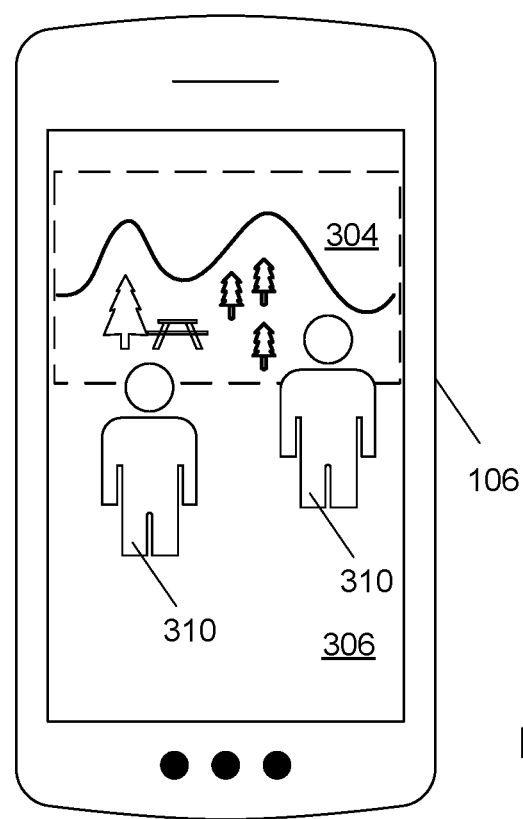

FIG. 3B shows the AR image on the mobile device.

Figure 4:
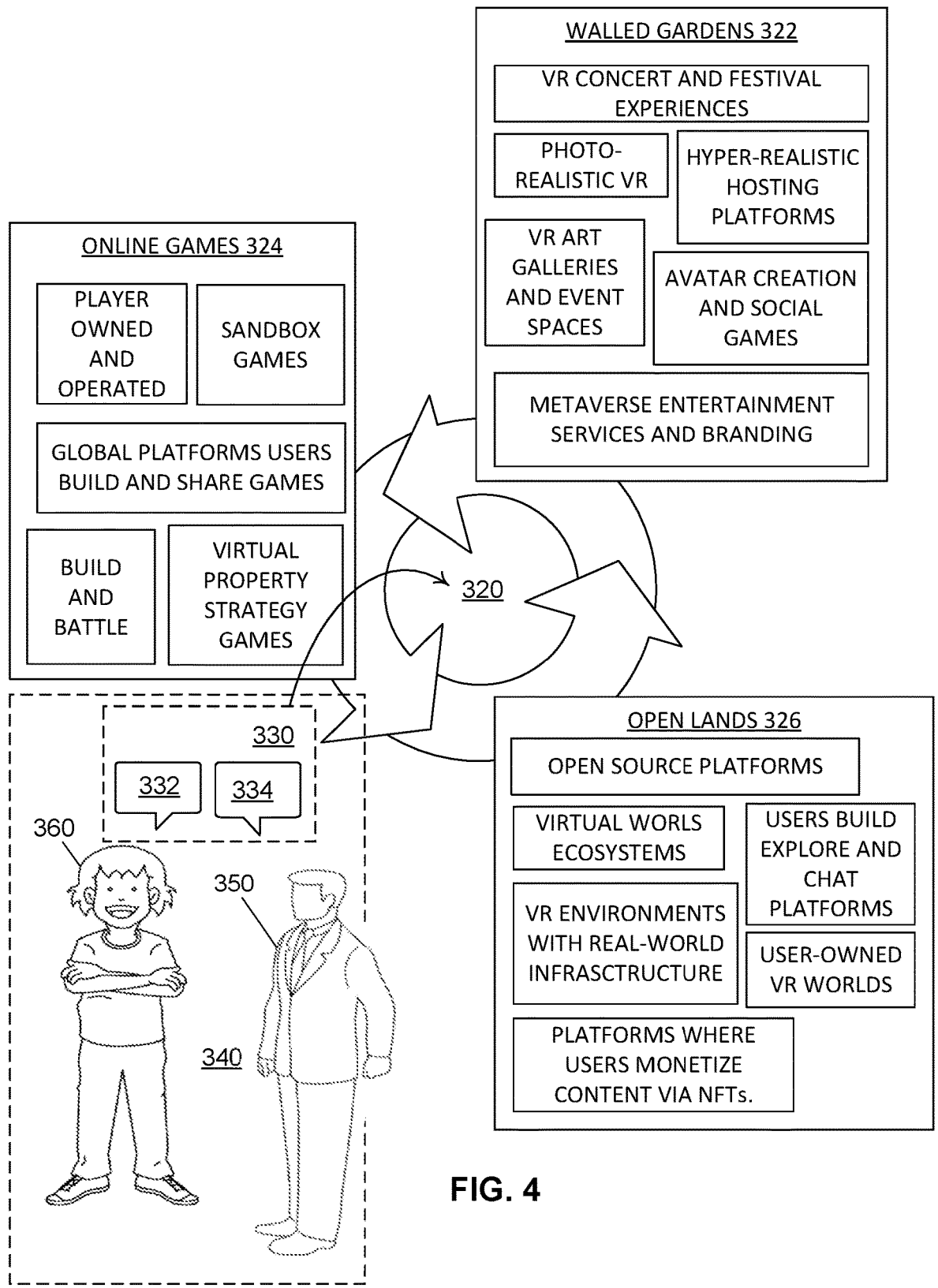

FIG. 4 shows organizational categories of graphical modeling content and a graphical representation of a communication session in a VR presentation according to at least one embodiment.

Figure 5:
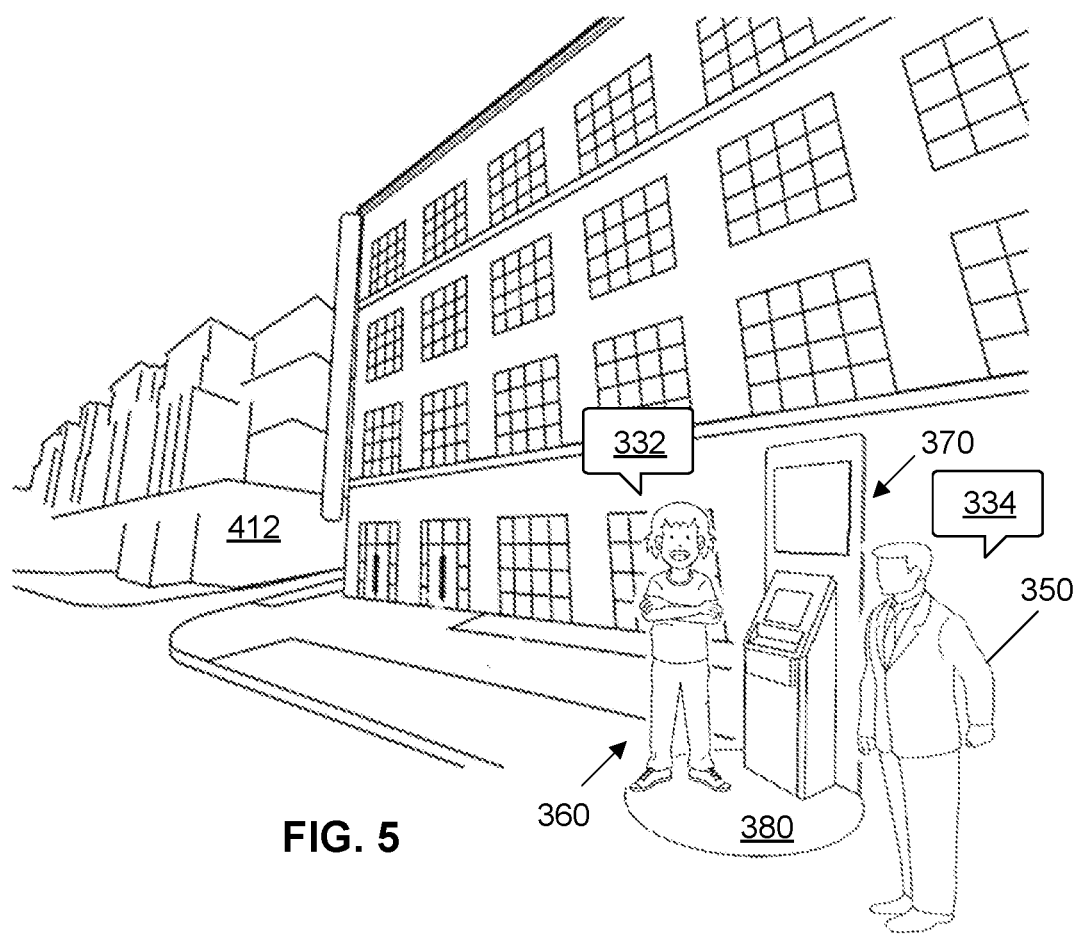

FIG. 5 shows a display, for example in a VR presentation, of a communication session according to at least one embodiment in a first virtual environment.

Figure 6:
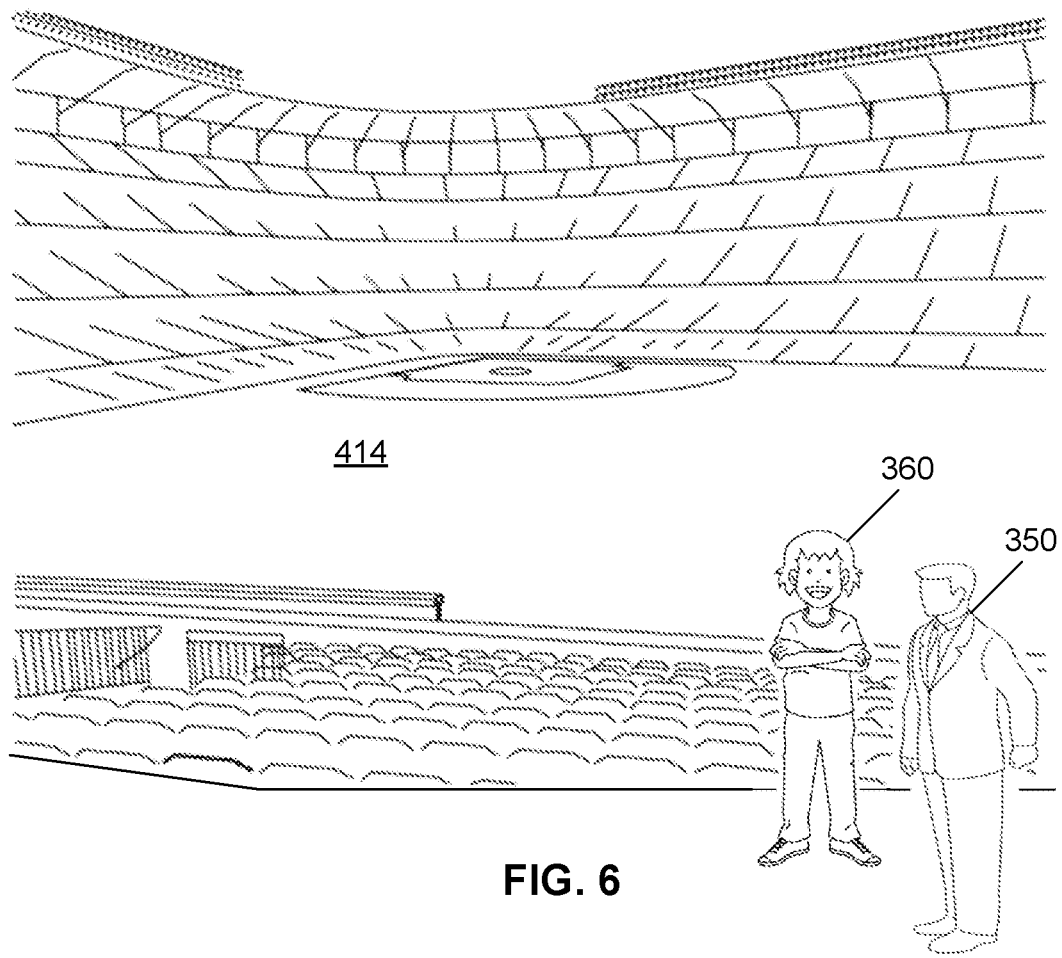

FIG. 6 shows a display, for example in a VR presentation, of a communication session according to at least one embodiment in a second virtual environment.

Figure 7:
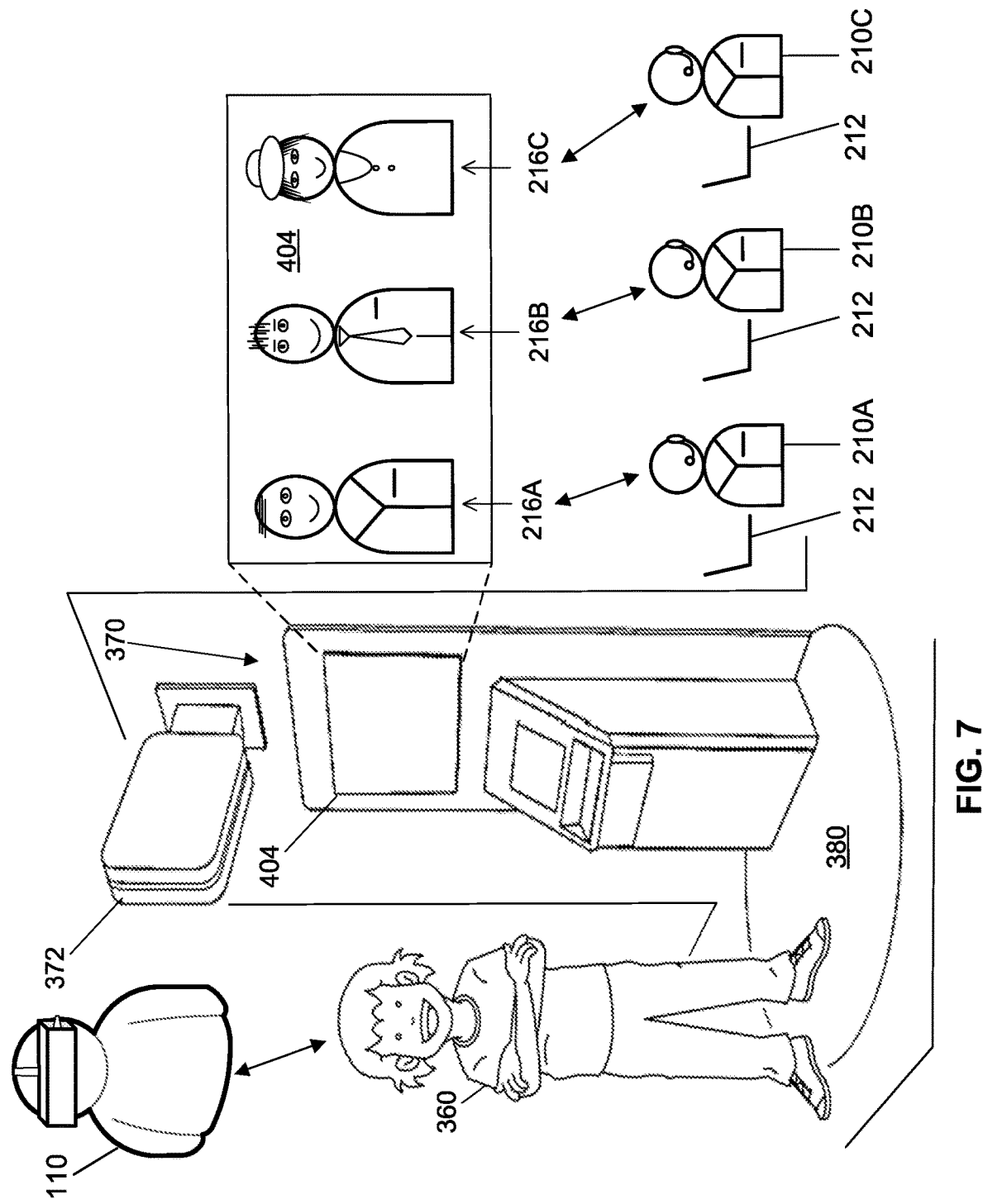

FIG. 7 shows a user, represented by an avatar, interacting in a VR presentation with one or more human agent, each represented by a respective simulated agent.

Figure 8:
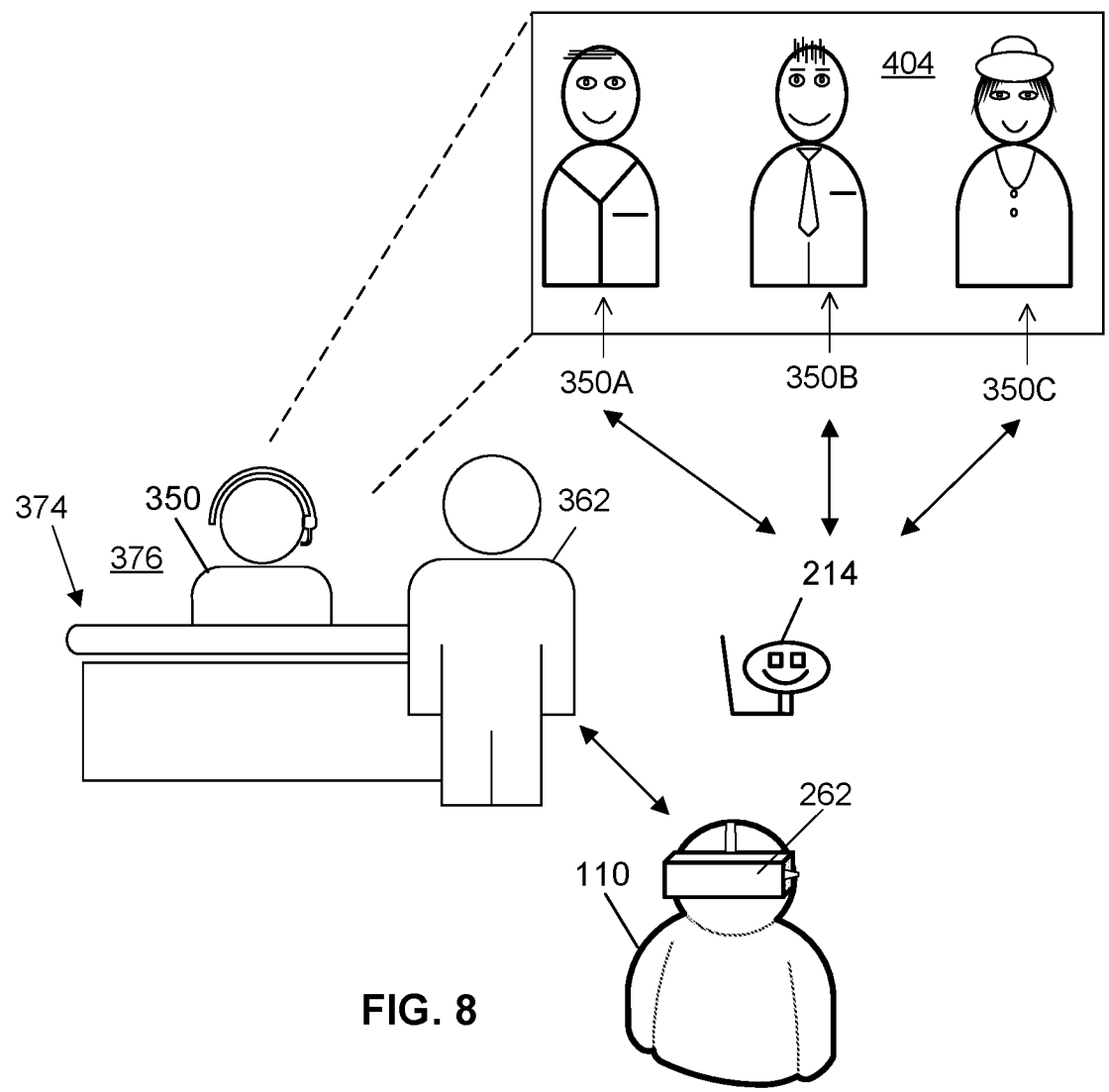

FIG. 8 shows a display, for example in a VR presentation, of a communication session according to at least one embodiment in a third virtual environment.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

The above-described systems and computing devices, in some embodiments, are used in whole or in part to implement virtual reality (VR) and/or augmented reality (AR) functioning. Virtual reality refers to a computer-generated simulation of a three-dimensional image or environment that can be interacted with in a seemingly real or physical way by a person using special electronic equipment, such as a visor or helmet with an internal screen, and gloves, hand-held controller, and/or other effects fitted with sensors. A VR experience is typically immersive, offering the user a typically entirely artificial computer-generated environment. As vision of the real world around the user is occluded by a visor or helmet, a VR session typically occurs indoors and/or in a safe controlled environment for the safety of the user. VR equipment items are typically interactive devices represented in FIG. 2A as a visor or helmet 262, hand-held or mounted controllers 264, and sensors 266. Connections 270 in FIG. 2A represent interconnectivity among the visor or helmet 262, controllers 264, and sensors 266. The connections 270 may be wireless as represented in FIG. 2A and/or may included wired connections as well.

VR applications immerse the user in a computer-generated environment (FIG. 2B) that simulates reality through the use of the interactive devices. The helmet or visor provides the user with a stereoscopic view 268 of animated images in the simulated environment. The illusion of "being there" (telepresence) is effected by motion sensors that pick up the user's movements to enable adjustment of the view provided the user in real time. Thus, a user can tour a simulated suite of rooms, experiencing changing viewpoints and perspectives that are convincingly related to their own head turnings and steps. The hand-held or mounted controllers 264 typically include buttons and/or triggers 272 by which user actions are relayed to the computing device or system 274 to effect user control of their simulated character and/or to implement user actions with the simulated environment. The hand-held or mounted controllers 264 can be equipped with force-feedback devices that provide the sensation of touch. The hand-held or mounted controllers 264 can be ergonomically formed for comfort and secure grasp in use.

The user can, for example, pick up and manipulate objects that they see in the virtual environment. Visual confirmation of hand-held items and their manipulation can be presented to the user in the simulated environment via a simulated view of the hands, which may appear as character hands 278, such as robot, alien, athlete, soldier or other character hands. Indeed, a whole body or partial body representative of the user may be displayed in graphical form, such as an avatar or other graphical indicium under user control. Portions of such an avatar or other graphical indicium may be displayed to the user from virtual eye perspective according to body position. In some examples, a graphical indicium representing and/or controlled by the user can be as minimal as a cursor or other indicator.

Connections 276 in FIG. 2A represented interconnectivity between the sensors and/or other interactive devices with a computing device or system 274 by which calculations and other operation are conducted to dynamically produce the changing simulated environment in which user actions such as hand movements, head movements (looking up, down, left, and right), and user-positioning within a safe environment are typically all represented in the simulated environment. The connections 276 may be wired as represented in FIG. 2A and/or may be or include wireless connections as well. The computing device or system 274 may represent any of the user computing device 104, the mobile device 106, the computing system 206 of the enterprise system 200, and/or the external systems 202 and 204 (FIG. 1). A visual VR session is illustrated in FIG. 2B. Audio information may be provided as well, for example via speakers within or mounted on the visor or helmet 262 or other nearby equipment items. A VR session can be used for gaming, viewing information, navigation, and many other uses. Augmented reality (AR) refers to the integration of digital information with the user's environment in real time. Unlike virtual reality (VR), which creates a totally artificial environment, AR users experience a real-world environment with computer-generated perceptual information visually combined or overlaid on real world images. The computer-generated simulation of a three-dimensional image or environment can be interacted with in a seemingly real or physical way, typically using a mobile phone such as the user mobile device 106. Because an AR experience does not typically greatly occlude the user's view of their real environment, AR use is potentially more mobile and safer to use outdoors and/or in less controlled environments than VR. However, electronic equipment, such as the visor or helmet 262 (FIG. 2A) and hand-held or mounted controllers 264 may be used as well.

FIG. 3A illustrates an AR session in which a user 302 views a background scene 304 through an AR equipped mobile device 106. FIG. 3B shows the AR image 310 on the mobile device 106. A visual AR session is illustrated. Audio information may be provided as well via speakers of the device 106. The AR image 306 includes characters 310 combined with or overlaid in the background scene 304. Any number of artificial characters and/or objects can be included. An AR session can be used for gaming, viewing information, navigation, and many other uses.

VR and AR experiences are increasingly available online and modern navigation of online content is expected increasingly be navigated by these technologies, giving rise to the term metaverse. The metaverse 320 (FIG. 4) is essentially conceived as networked simulated digital environments permitting high user engagement with not only online services and content, but social connections as well. Persistent simulated virtual worlds have arrived, using blockchain technology in some instances to promote continuity, credibility, and even security where virtual assets are concerned. The metaverse is evolving as a multi-world space for online interaction facilitated by mobile internet as well as augmented reality and/or virtual reality equipped devices and gear.

Several types of sites have appeared. Their features are somewhat shared and somewhat differentiated. Although any given site may be considered as one or more of the below described types, some categorization is useful for understanding the current state and future of the metaverse.

Sites, domains, or platforms known as "walled gardens" tend to have controlled access, and tend to be event-based and hyper-realistic. A typical walled garden has centralized ownership and guideline governance, offers a tailor-made experience, and utilizes fiat currency. Non-limiting examples of walled gardens include Surreal, Zoan, Burst, Spatial, Hyperreal, and Omniya.

Online games are currently highly popular. They tend to have centrally-controlled governance, utilize private token currency, and offer a managed experience. Non-limiting examples of online games include Roblox, Axie Infinity, Fortnite, Minecraft, and Upland.

Sites, domains, or platforms known as "open lands" tend to have open access, and some are always on or persistently active. Decentralized governance and limited guidelines are attracting relative high investment relative to other platform types. Interoperability is also a relative characteristic of open lands, where non-fungible tokens (NFT) and cryptocurrencies such as stablecoins are used to manage and exchange ownership of assets. Non-limiting examples of open lands include Somnium Space, NFT Worlds, Substrata, Cryptovoxels, Decentraland, and Netvrk.

Walled gardens 322, online games 324, and open lands 326 are represented as separate in FIG. 4, which also further provides examples of their uses and features. Any given site, domain, or platform can have characteristics of one or more of these and other types of sites, domains, or platforms, such that delineations between walled gardens, online games, and open lands, are not necessarily absolute or universally agreed upon. Hosting services at sites, domains, or platforms providing navigable virtual experiences are referenced and represented herein as modeling servers each providing a respective geometric model.

A typical user in the metaverse is represented by and controls a personalized and movable graphical indicium defining an avatar. These personalized user-representative and user-controlled graphical indicia can take different forms or shapes. A typical user deploys their customized graphical indicium as their representative presence in any given virtual world.

Like a user's physical form, a customized graphical indicium may have many outward appearances by use of accessories amounting to virtual clothing, costumes, and gear. Continuity of a customized graphical indicium, for example by which users recognize each other in their shared virtual experiences, is provided by a base form, in correspondence for example to a human body. For descriptive purpose, the underlying base form of a customized graphical indicium is referenced herein as an object frame. Like a physical body, an object frame can be endowed with humanoid on animal-like attributes, like lower and upper torsos, operable limbs, and faces capable of exhibiting non-verbal cues. In a typical deployment, a customized graphical indicium may include user-selected graphical accessories overlaying the object frame like clothing or other layers. In some cases, the graphical accessories are virtually operable as well, as in the case of tools, weapons, armor, and other items.

Ownership and attributes of a customized graphical indicia, the object frame thereof, and the accessories thereof, may be recorded and safe-guarded via NFT security. User assets such as funds (virtual money), for example carried and/or represented by a virtual wallet, may be similarly protected. A non-fungible token (NFT) is generally a record on a blockchain associated with a particular asset, which can be digital, virtual, or physical. Ownership of an NFT is recorded in the blockchain, and can be transferred, allowing NFTs to be sold and traded. In some instances, assets may be in the form of, or may be transacted via, stablecoins, which are cryptocurrencies where the price is indexed to a reference asset. The reference asset may be fiat money, exchange-traded commodities, or a cryptocurrency.

In implementing inventive systems and methods according to these descriptions, a dialog is facilitated as a communication session 330 (FIG. 4) in a virtual environment 340 presented to the user during, for example, an interactive virtual reality (VR) presentation. A dialog occurs as at least a bidirectional interaction involving a user and at least one simulated agent 350, as graphically represented in FIG. 4 in humanoid form. In the VR presentation, the user may be represented by a personalized and movable graphical indicium 360. In the illustrated example, the graphical indicium 360 is represented as an avatar in whole body view, as seen for example by an observer. In practice in a VR presentation, portions of such an avatar may be displayed to the user, for example as arms and other body parts as viewed from virtual eye perspective according to body position. A graphical indicium representing and/or controlled by the user can be as minimal as a cursor or other indicator.

Another entity, for example termed the first entity and/or enterprise entity herein, is graphically represented by or as the simulated agent 350, which may be entirely virtual, as with a virtual agent 214 (FIG. 1), or may be a virtual representative of a human agent 210. In some cases, a communication session may begin between a human user and a first entity virtual agent, and may continue as a human agent is connected into the communication session. The human agent in some cases effectively joins the communication session as an additional participant and the session continues with graphical representations of the virtual agent and human agent, for example as separate avatars. The human agent in some cases replaces, in whole or in part, automated functions or duties of the virtual agent in the communication session, effectively taking control of the graphical representation of the simulated agent. The virtual agent is provided to engage and inform the user via the communication in the interactive virtual reality (VR) presentation. The communication session 330 includes content 332 from the user and content 334 from the simulated agent 350. Each content 332 and 334 may include visual and audible content from the user perspective. The communication session in some examples occurs as a visible and audible conversation in an immersive VR presentation.

In some examples, the first entity and/or enterprise entity herein may provide financial services and operate as a financial institution. The user entity may be previously and currently engaging the user in a range of services such as checking, credit card, debit card, mortgage, and savings account services. In such cases, where the user is a highly engaged client, the service entity has direct access to data regarding credit cards, checking, savings, and other financial arrangements and means. In such examples and others, the first entity maintains account records, each associated with a respective one of multiple user entities, for example as represented in FIG. 1 as data 234, which can include, as non-limiting examples, cached data, and files such as those for user accounts, user profiles, account balances, and transaction histories.

For security and confidentiality purposes, account records are generally secured from unauthorized access. Thus, the account records of a particular user are inaccessible during the bidirectional communication session without user authentication. However, even prior to or without such authentication, the simulated agent conducting the communication session can provide information, for example, about multiple services made available at least in part by the first entity. In examples of the first entity and/or enterprise entity providing financial services and/or operating as a financial institution, the services made available and for which information can be disseminated prior to or without user authentication can include, as non-limiting examples, policies and offerings for checking, credit card, debit card, mortgage, and savings account services, and the information disseminated can be provided without specific user account details in the absence of user authentication.

The account records of a particular user, in some examples, are made accessible to the user during the bidirectional communication session upon user authentication by the user. For example, a username and password may be provided to satisfy user authentication and/or further security measures may be applied. Upon user authentication, user access to accounts and actions may be permitted such as balance requests, funds transfers, funds conversions, and other information access and action regarding user owned or user associated assets.

The communication session 330, as represented in FIG. 4, can occur in virtual space in various places in various examples, for example throughout the metaverse 320 in locations chosen by either or both parties communicating. In some examples, particular spaces are created or leased and maintained at strategic virtual locations in third party geometric models provided by corresponding modeling servers. In some embodiments, a third party modeling server, fourth party modeling servers, and so forth are owned, provided, managed, or correspond to metaverse content providers, each providing a respective geometric model by which a respective virtual world or environment is displayed at least in part to a user in a VR presentation. Such modeling servers can each be characterized as providing content representing walled gardens, online games, and open lands. For example, a modeling server can be owned, provided, managed, or correspond to at least one of Surreal, Zoan, Burst, Spatial, Hyperreal, Omniya, Roblox, Axie Infinity, Fortnite, Minecraft, Upland, Somnium Space, NFT Worlds, Substrata, Cryptovoxels, Decentraland, and Netvrk, as non-limiting and non-exclusive examples.

The virtual position, location, or address of the communication session may be predetermined, for example by the first entity or a third party placement of a marker 370, for example displayed in a three-dimensional environment. As shown in FIG. 5, the marker 370 can be displayed as a virtual kiosk. A representative graphical form, such as the illustrated kiosk or other form, is advantageous by serving to identify the marker in one or more virtual environment, permitting users to recognize access locations and navigate their customized graphical indicia defining their avatars to such access locations for use of the functions available at the maker. To maintain control and ownership by the first entity or other controlling party, the marker may be or correspond to a non-fungible token (NFT). In FIG. 7, the marker 370 is shown as a kiosk in a virtual environment with further virtual signage 372 further facilitating familiarity for locating and accessing the marker by a user. A marker 370 can further include or be graphically represented as, in whole or in part, a virtual service office location, appearing as a bank branch in examples where the first entity provides financial services and operates as a financial institution. As represented in another example in FIG. 8, a marker 374 is represented as a counter or desk in a virtual environment 376 such as a virtual branch office or other virtual service area.

The virtual position, location, or address of the communication session in some examples is selected by the user, for example enabled by an app or other operable function on a user device to summon a simulated agent. As represented in FIG. 4, the illustrated communication session 340 can occur, in some examples, where convenience of the user is served as the user navigates the metaverse.

In some embodiments, a bidirectional communication session is automatically initiated, for example as represented by the appearance of a simulated agent 350 of the first entity, upon a customized graphical indicium 360 of a user arriving in a virtual proximity zone 380 of the marker 370, for example as represented by a circular area in FIGS. 5 and 7. In other examples, the bidirectional communication session is initiated by virtual user action at the marker 370, appearing for example as a kiosk and/or ATM. The marker 370 in some embodiments enables access to assistance, for example via a virtual agent 214 and/or a human agent 210 of the enterprise system 200, for advisory communications, in textual, auditory, spoken, and/or graphical format by summons or automated appearance of the simulated agent 350.

In various embodiments, a system for bidirectional user interaction in a graphically simulated environment includes a computing system 200 having one or more processor 220 and at least one of a memory device 222 and a non-transitory storage device 224. The one or more processor is configured to execute computer-readable instructions, for example as stored on the memory device and/or the non-transitory storage device. A network connection 258 operatively connects the computing system to at least one user device (104, 106). Upon execution of the computer-readable instructions, the computing system performs steps including: causing display, on the at least one user device (104, 106), of a simulated agent 350 of a first entity in a three dimensional virtual environment (412, 414, 376); and controlling the simulated agent to engage a user represented by a user customized graphical indicium 360 in the three dimensional virtual environment 412.

Display, displaying, causing to display, causing display, and similar terms in these descriptions with reference to FIGS. 4-8 describe at least VR presentations to a user as in FIGS. 2A-2B, AR presentations to a user as in FIGS. 3A-3B, and other displayed presentation types.

The computing system 200 in some embodiments conducts a bidirectional communication session 330 with the user via the simulated agent 350 and the user customized graphical indicium 360 in the three dimensional virtual environment. Requests may be received from the user, represented as user input 332 in FIGS. 4-5, the request from the user regarding at least one service of multiple services made available at least in part by the first entity. A reply, as represented as content 334 from the simulated agent 350, may be provided disseminating at least a first information item associated with the at least one service. For example, the simulated agent conducting the communication session can provide information about multiple services made available at least in part by the first entity. Such services may include, in non-limiting examples, services and products relating to banking, such as checking, savings, investments, credit cards, automatic-teller machines, debit cards, loans, mortgages, personal accounts, business accounts, account management, credit reporting, credit requests, and credit scores.

The simulated agent may engage the user represented by the user customized graphical indicium in the three dimensional virtual environment in a virtual-reality (VR) presentation to the user. The simulated agent 350 may represent or be an automated virtual agent 214 using conversational artificial intelligence (AI), in which case the virtual agent 214 automatically conducts the bidirectional communication session with the user. The simulated agent 350 and/or the virtual agent 214 can be operable with or via an artificial intelligence (AI) system for guiding user interaction via a voice response unit or a chat engine. The AI system may be trained, for example using real dialog transcriptions from past user interactions which have been supplemented with decision points and outcomes to thus learn what questions to ask and what actions to take based on user responses in order to achieve a most favorable outcome FIG. 8 represents an example in which a virtual agent 214 conducts a the bidirectional communication session with the user, who is represented in FIG. 8 by a graphical indicium 362 defining an avatar in the virtual environment 376. For presentation purposes, the virtual agent 214 is represented in the virtual environment 376 in humanoid form and may have one of several appearances 350A, 350B and 350C. The particular appearance or avatar appearance of the simulated agent 350 in some examples is selected by the user 110 in a VR presentation or interaction. For example, several selectable choices for the appearance of the simulated agent may be shown on the display 404 of the marker 370 when appearing as kiosk as represented in FIG. 8.

The computing system in some examples connects a human agent 210 into the communication session and causes display of a second simulated agent at least in part controlled in real time by the human agent. The simulated agent may include or appear as a graphical indicium at least in part controlled in real time by a human agent. For presentation purposes, each agent 210A, 210B, and 210C (FIG. 7) is represented by a respective simulated agent 216A, 216B, and 216C. When a human agent is engage with a user in a communication session, the real time voice, and optionally approximated appearance, of the human agent may be represented in the virtual environment of the session.

The three dimensional virtual environment in which a communication session is conducted can be represented as a virtual-reality (VR) presentation of a geometric model provided by a third party via a modeling server connected to each of the user device and the computing system of the first entity. In some embodiments, the network connection 258 operatively connects the computing system 200 to multiple modeling servers, for example as represented by the external systems 202 and 204 in FIG. 1. Each of the modeling servers provides a respective geometric model. In the expressly illustrated example, the multiple modeling servers include at least a first modeling server, represented by external system 202, and a second modeling server, represented by external system 204, the respective geometric models of which are represented in FIGS. 5 and 6. In the particular illustrated and non-limiting examples, the geometric model of the first modeling server, referenced nominally as a first geometric model 412 (FIG. 5), is represented as a three-dimensional urban virtual environment. The geometric model of the second modeling server, referenced nominally as a second geometric model 414 (FIG. 6), is represented as a three-dimensional sports arena virtual environment. These descriptions relate as well to other virtual environment types.

Upon execution of the computer-readable instructions, the computing system performs steps including accessing at least a portion of a geometric model, causing display of the portion of the geometric model as represented in FIG. 5 and/or FIG. 6, and receiving a user navigation signal prompting movement of a user-controlled avatar represented by the graphical indicium 360 in the geometric model. The movement of the graphical indicium 360 corresponds to, for example, user-representative customized graphical indicium movement as the user navigates the geometric model, for example by use of the controllers 264 (FIG. 2A) or other user-operable navigation buttons or controls, being physical or virtual, and being local on a user device or accessible to the user via a connected session to the computing system 200 or the external system 202.

In implementing inventive systems and methods according to these descriptions, a dialog facilitated as a communication session in a virtual environment permits the user to submit requests, at a user device, regarding services made available at least in part by the first entity, and replies to be returned to the user device by way of the simulated agent. Thus information can be disseminated about multiple services made available at least in part by the first entity. This facilitates a sense of personal interaction prior had by real travel of the user to a first entity physical location such as a service branch. Implementation of the inventive systems and methods according to these descriptions thereby reduces physical traffic and the associated thermal and atmospheric impact of, for example, automobile use. Thus, the function of roadways and other vehicular thoroughfares for needed services, such as emergency response vehicles, is improved by reduced congestion. Further, by facilitating personalization in question and answer sessions, wide casting of information across digital and other electronic media is reduced. Thus, data traffic on network connections is reduced, improving network efficiencies, reducing latencies, thereby improving the functioning or networked computers, and reducing operating costs.

The above advantages and features can be implemented in various system and device hardware examples, and can also be practiced as one or more methods, which are at least expressed by implication with the above described systems, and by which bidirectional user interaction in a graphically simulated environment is provided in keeping with the above descriptions. Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for bidirectional user interaction in a graphically simulated environment, said system comprising:
    a computing system including one or more processor and at least one of a memory device and a non-transitory storage device, wherein said one or more processor executes computer-readable instructions; and
    a network connection for operatively connecting the computing system to at least one user device;
    wherein, upon execution of the computer-readable instructions, the computing system performs steps comprising:
        causing display, on the at least one user device, of a simulated agent of a financial institution in a three dimensional virtual environment;
        causing the simulated agent to engage a user represented by a user customized graphical indicium in the three dimensional virtual environment;
        conducting a bidirectional communication session with the user via the simulated agent and the user customized graphical indicium in the three dimensional virtual environment;
        receiving, from the user, a first request associated with a user account regarding at least one service of multiple services made available at least in part by the financial institution;
        determining the first request is directed to information that does not require user authorization to access;
        disseminating, via the simulated agent within the three dimensional virtual environment and based upon determining the first request is directed to information that does not require user authorization to access, a first information item associated with the at least one service, wherein the at least one service is associated with the user account;
        receiving, from the user, a second request associated with the user account regarding at least one service of multiple services made available at least in part by the financial institution, wherein the second request is directed to information that requires user authorization to access;
        requesting authentication information associated with the user account based on the second request being directed to information that requires user authorization to access;
        transmitting, to a database associated with the financial institution, the requested authentication information;
        receiving, from the database associated with the financial institution, an indication confirming the requested authentication information is associated with the user account; and
        disseminating, via the simulated agent within the three dimensional virtual environment and based on the request, a second information item associated with the at least one service.

2. The system according to claim 1, wherein the computing system controls said simulated agent to engage the user represented by the user customized graphical indicium in the three dimensional virtual environment in a virtual-reality (VR) presentation to the user.

3. The system according to claim 1, wherein:
    said simulated agent comprises a virtual agent using conversational artificial intelligence (AI); and
    the virtual agent automatically conducts the bidirectional communication session with the user.

4. The system according to claim 3, further comprising connecting a human agent into the communication session and causing display of a second simulated agent at least in part controlled in real time by the human agent.

5. The system according to claim 1, wherein said simulated agent comprises a graphical indicium at least in part controlled in real time by a human agent.

6. The system according to claim 1, wherein:
    the financial institution maintains user account records each associated with a respective one of multiple users, the multiple users including said user; and
    the user account records associated with said user are inaccessible to said user during the bidirectional communication session without user authentication.

7. The system according to claim 6, wherein the user account records of said user are accessible to said user during the bidirectional communication session upon user authentication by said user.

8. The system according to claim 1, wherein the three dimensional virtual environment comprises a virtual-reality (VR) presentation of a geometric model provided by a third party via a modeling server connected to each of the user device and the computing system.

9. The system according to claim 1, wherein the simulated agent is selected by said user from multiple simulated agents each represented in at least one display available to said user by a respective graphical indicium for selection by said user.

10. The system according to claim 1, wherein:
    prior to causing display of the simulated agent, the computing system causes display of a kiosk in the three dimensional virtual environment; and causing display of the simulated agent is responsive to the user customized graphical indicium at least approaching the kiosk under user navigational control.

11. The system according to claim 1, wherein:
prior to causing display of the simulated agent, the computing system causes display of a marker in the three dimensional virtual environment; and
causing display of the simulated agent is responsive to the user customized graphical indicium at least approaching the marker under user navigational control.

12. A system for bidirectional user interaction in a graphically simulated environment, said system comprising:
a computing system including one or more processor and at least one of a memory device and a non-transitory storage device, wherein said one or more processor executes computer-readable instructions; and
a network connection for operatively connecting the computing system to at least one user device;
wherein, upon execution of the computer-readable instructions, the computing system performs steps comprising:
causing display, on the at least one user device, of a simulated agent of a financial institution in a three dimensional virtual environment in a virtual-reality (VR) presentation, wherein the financial institution maintains user account records each associated with a respective one of multiple users, wherein the multiple users comprises the users, wherein the user account records are inaccessible to said user during the bidirectional communication session without user authentication;
causing the simulated agent to at least audibly engage a user represented by a user customized graphical indicium in the three dimensional virtual environment;
conducting a bidirectional communication session with the user via the simulated agent and the user customized graphical indicium in the three dimensional virtual environment;
receiving, from the user, a first request associated with a user account record associated with the user, wherein the request is associated with a first service of multiple services made available at least in part by the financial institution;
determining the first request is directed to information that does not require user authorization to access;
providing, via the simulated agent within the three dimensional virtual environment and based upon determining the first request is directed to information that does not require user authorization to access, a first information item associated with the at least one service, wherein the first service is associated with the user account;
receiving, from the user, a second request associated with the user account regarding at least one service of multiple services made available at least in part by the financial institution;
determining, based on the second request, the user is required to be authorized prior to accessing information associated with the first service;
receiving, from the user, authorization information associated with the user account record;
transmitting, to a database associated with the financial institution, the authentication information;
receiving, from the database associated with the financial institution, an indication confirming the requested authentication information is associated with the user account record; and
providing, via the simulated agent within the three dimensional virtual environment, a second information item associated with the first service, wherein the first service is associated with the user account records display.

13. The system according to claim 12, wherein:
said simulated agent comprises a virtual agent audibly using conversational artificial intelligence (AI); and
the virtual agent automatically conducts the bidirectional communication session with the user.

14. The system according to claim 13, further comprising connecting a human agent into the communication session and causing display of a second simulated agent at least in part controlled in real time by the human agent.

15. The system according to claim 12, wherein said simulated agent comprises a graphical indicium at least in part controlled in real time by a human agent.

16. The system according to claim 12, wherein the three dimensional virtual environment comprises a virtual-reality (VR) presentation of a geometric model provided by a third party via a modeling server connected to each of the user device and the computing system.

17. A method for a computing system to conduct bidirectional user interaction in a graphically simulated environment, the computing system including one or more processor, at least one of a memory device and a non-transitory storage device, and a network connection for operatively connecting the one or more processor to at least one user device, the one or more processor configured to execute computer-readable instructions, the method comprising, upon execution of the computer-readable instructions:
causing display, on the at least one user device, of a simulated agent of a financial institution in a three dimensional virtual environment;
causing the simulated agent to engage a user represented by a user customized graphical indicium in the three dimensional virtual environment;
conducting a bidirectional communication session with the user via the simulated agent and the user customized graphical indicium in the three dimensional virtual environment;
receiving, from the user, a first request associated with a user account regarding at least one service of multiple services made available at least in part by the financial institution;
determining the first request is directed to information that does not require user authorization to access;
disseminating, via the simulated agent within the three dimensional virtual environment and based upon determining the first request is directed to information that does not require user authorization to access, a first information item associated with the at least one service, wherein the at least one service is associated with the user account;
receiving, from the user, a second request associated with the user account regarding at least one service of multiple services made available at least in part by the financial institution, wherein the second request is directed to information that requires user authorization to access;
requesting, based on the second request being directed to information that requires user authorization to access, authentication information associated with the user account;

transmitting, to a database associated with the financial institution, the requested authentication information;

receiving, from the database associated with the financial institution, an indication confirming the requested authentication information is associated with the user account; and disseminating, via the simulated agent within the three dimensional virtual environment and based on the request, a first second information item associated with the at least one service, wherein the at least one service is associated with the user account.

18. The method according to claim 17, wherein the computing system controls said simulated agent to engage the user represented by the user customized graphical indicium in the three dimensional virtual environment in a virtual-reality (VR) presentation to the user.

19. The method according to claim 17, wherein:

said simulated agent comprises a virtual agent audibly using conversational artificial intelligence (AI); and the virtual agent automatically conducts the bidirectional communication session with the user.

20. The method according to claim 17, further comprising connecting a human agent into the communication session and causing display of a second simulated agent at least in part controlled in real time by the human agent.

* * * * *